United States Patent [19]
Nording et al.

[11] Patent Number: 5,799,395
[45] Date of Patent: Sep. 1, 1998

[54] PROCESS FOR MANUFACTURING AN AIR GAP-INSULATED EXHAUST PIPE

[75] Inventors: Thomas Nording, Esslingen; Alfred Utter, Waldmohr, both of Germany

[73] Assignee: J. Eberspächer GmbH & Co., Esslingen, Germany

[21] Appl. No.: 692,814

[22] Filed: Jul. 30, 1996

Related U.S. Application Data

[62] Division of Ser. No. 368,417, Jan. 4, 1995.

[30] Foreign Application Priority Data

Jan. 7, 1994 [DE] Germany ............... P4400313.7
Oct. 19, 1994 [DE] Germany ............... P4437380.5

[51] Int. Cl.$^6$ ............................................. B23P 15/00
[52] U.S. Cl. ......................... 29/890.08; 29/890.036; 29/890.053
[58] Field of Search ............... 29/890.08, 890.036, 29/890.053, 434, 455.1; 138/112, 113, 148

[56] References Cited

U.S. PATENT DOCUMENTS

| | | |
|---|---|---|
| 3,500,954 | 3/1970 | Willette . |
| 4,356,885 | 11/1982 | Dello ........................... 181/227 |
| 4,501,302 | 2/1985 | Harwood ....................... 138/113 |
| 4,590,652 | 5/1986 | Harwood ..................... 29/890.08 |
| 4,656,713 | 4/1987 | Rosa et al. ................... 29/890.08 |
| 5,100,047 | 3/1992 | Nakagawa et al. ........... 29/890.08 |
| 5,170,557 | 12/1992 | Rigsby ........................ 29/890.08 |
| 5,186,502 | 2/1993 | Martin ......................... 138/113 |
| 5,390,494 | 2/1995 | Clegg ........................ 29/890.08 |
| 5,673,470 | 10/1997 | Dehlinger et al. ........... 29/890.08 |

*Primary Examiner*—Irene Cuda
*Attorney, Agent, or Firm*—McGlew and Tuttle

[57] ABSTRACT

An air gap-insulated exhaust pipe with a sliding fit between two inner pipe sections in a middle area of the length of the exhaust pipe has a radial mounting of the inner pipe in the outer pipe which is provided in the area of a bend or beyond the bend, which joins the leg of the exhaust pipe in which the sliding fit is located. In terms of manufacturing technique, the radial mounting may be prepared before or after the bending of the double-pipe arrangement. The sliding fit may be prepared, even in the case of a straight exhaust pipe, manifold, or the like, by using a spacer sleeve and joint calibration of the pipe ends of the inner pipe sections, and the spacer sleeve burns off at the time the exhaust pipe is put into operation for the first time. As an alternative, the sliding fit may also be prepared by polygon calibration and rotating the pipe ends by half the pitch of the polygon.

20 Claims, 5 Drawing Sheets

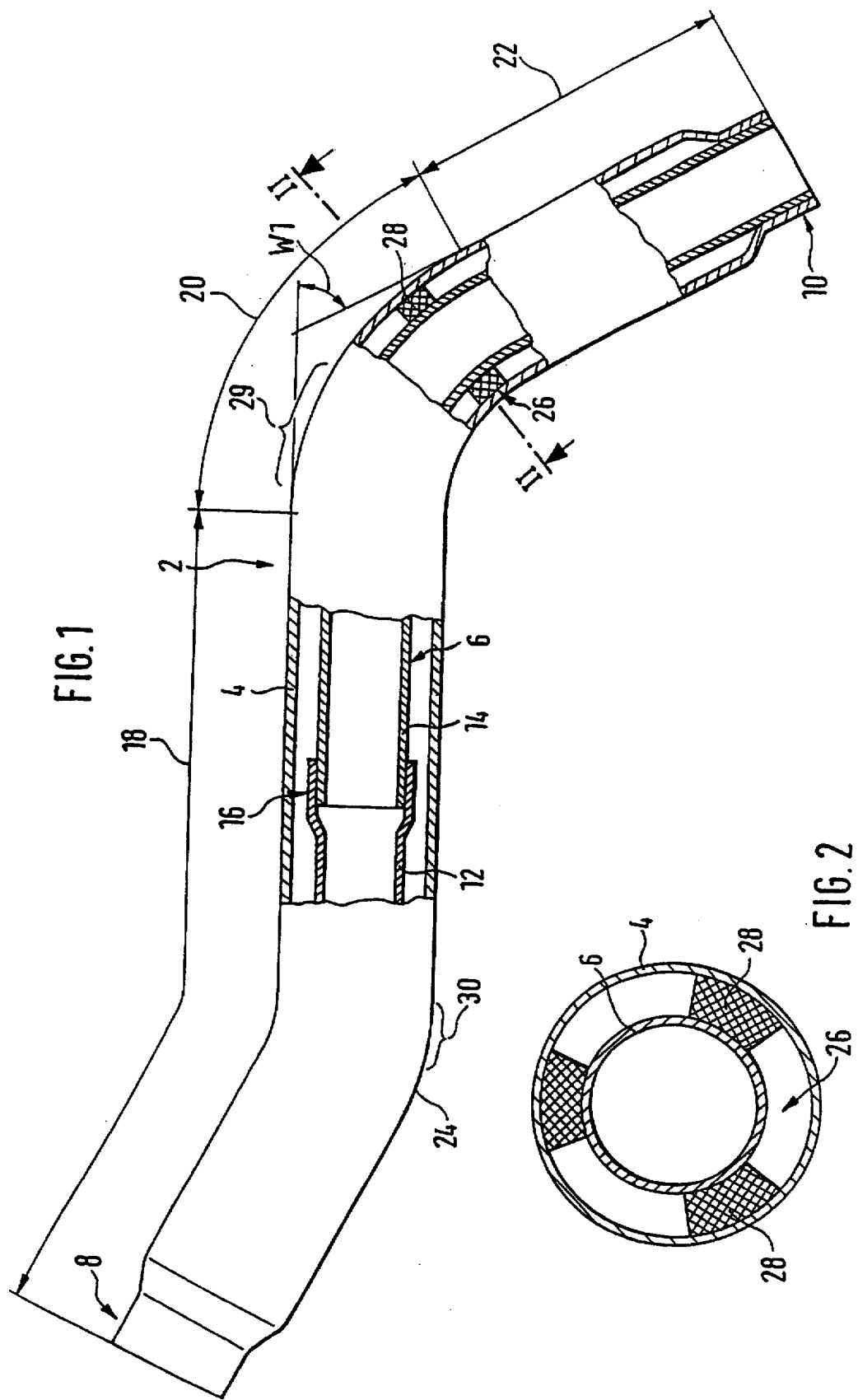

Fig. 5
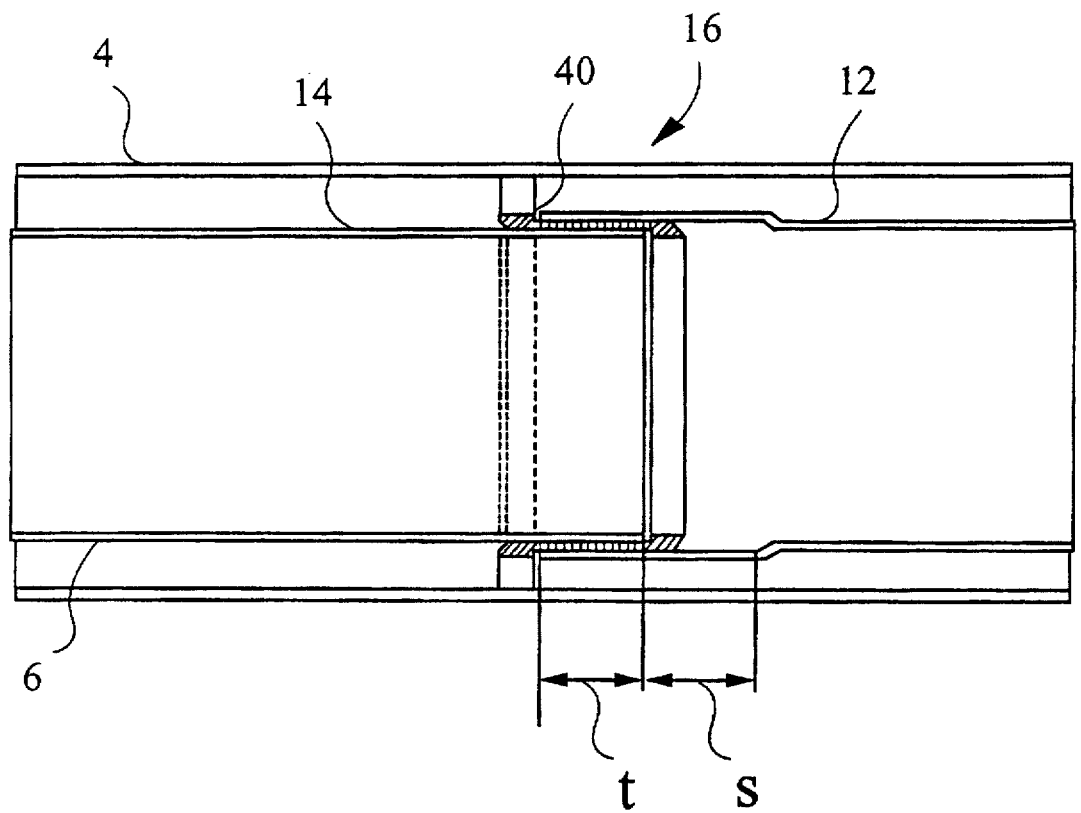
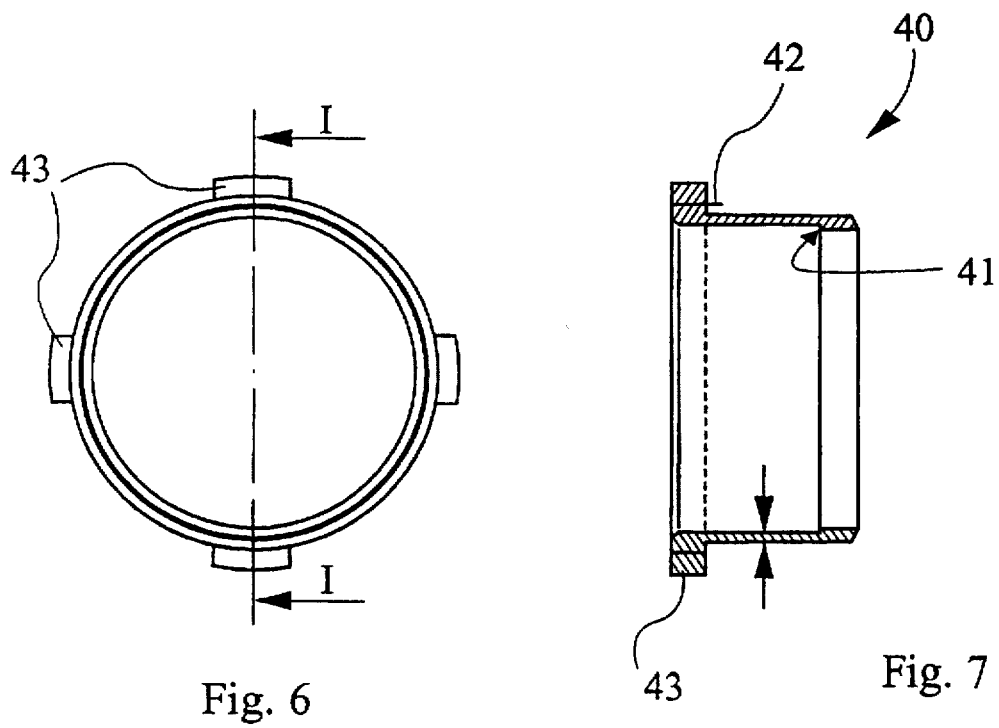
Fig. 6
Fig. 7

PROCESS FOR MANUFACTURING AN AIR GAP-INSULATED EXHAUST PIPE

This is a divisional of application Ser. No. 08/368,417 filed Jan. 4, 1995.

FIELD OF THE INVENTION

The present invention pertains to an exhaust pipe, which is designed as an air gap-insulated, double-walled pipe with an outer pipe and an inner pipe, wherein two inner pipe sections connected via a sliding fit are provided, and a radial mounting of the inner pipe in the outer pipe can be provided at least at one point between the ends of the exhaust pipe, and the exhaust pipe may also have a first leg, a second leg, and a bend connecting the two legs.

BACKGROUND OF THE INVENTION

Air gap-insulated, double-walled exhaust pipes have been increasingly used especially in exhaust systems of motor vehicles, primarily for the area between the internal combustion engine or its exhaust manifold, which collects the exhaust gases from a plurality of cylinders, and an exhaust gas catalytic converter; the latter normally has one or more exhaust gas treatment bodies of large inner surface, through which bodies exhaust gas can flow. The treatment bodies are coated with a catalytically active substance, wherein the exhaust gas treatment bodies are mounted in a sheet-metal housing. Air gap-insulated exhaust pipes bring about a reduction in the release of heat by the exhaust gases to the environment, so that the exhaust gas flows into the exhaust gas catalytic converter at a higher temperature than in the case of a single-walled exhaust pipe. This is significant especially during the warm-up period of the internal combustion engine, because the exhaust gas treatment body will thus rapidly reach its operating temperature. In addition, a relatively thin-walled inner pipe made of a high-temperature-resistant material and an outer pipe of greater wall thickness made of a less expensive material can advantageously be used.

Since the inner pipe of air gap-insulated exhaust pipes reaches considerably higher operating temperatures than the outer pipe, and it frequently consists of a material different from that of the outer pipe, there will be differences in thermal expansion between the inner pipe and the outer pipe during operation. Depending on the length of the air gap-insulated exhaust pipes and the temperature difference between the inner pipe and the outer pipe, there will be differences in length between the inner pipe and the outer pipe, which may easily amount to a few mm. Such differences in length must be compensated, and the provision of a sliding fit between the inner pipe and the outer pipe at one end of the exhaust pipe has hitherto been a common practice. However, particularly if the exhaust pipe has a bend, problems will arise in this simple design, because some areas of the inner pipe will come very close to the outer pipe during heating, which entails the risk of noise generation due to metallic impacts.

The idea of rigidly connecting the inner pipe at both ends to the outer pipe and of providing a sliding fit between two inner pipe sections somewhere between the ends of the exhaust pipe has already been proposed. However, such exhaust pipes have not yet been able to be manufactured economically if a radial mounting of the inner pipe in the outer pipe is to be present somewhere between the ends of the exhaust pipe. Such a radial mounting is especially advantageous in the case of relatively long or bent exhaust pipes. In such cases, the only possibility has hitherto been to cut through the double-walled exhaust pipe, bent to its final shape, at right angles at a point, and to subsequently prepare the sliding fit there between the two inner pipe sections, as well as a radial mounting of the inner pipe in the outer pipe, after which the exhaust pipe was again welded together at the point of separation. Thus, the sliding fit and the radial mounting are practically inherently located at the same point of the length of the exhaust pipe. The described manner of manufacture is cumbersome and expensive.

SUMMARY AND OBJECTS OF THE INVENTION

The basic object of the present invention is to provide an air gap-insulated exhaust pipe of the type described in the introduction, in which both the differences in thermal expansion between the inner pipe and the outer pipe are compensated, and the generation of noise due to the impaction of the inner pipe against the outer pipe is avoided with certainty by using simple means.

The basic task of the present invention is accomplished by the sliding fit being provided at a first point, which is located in the first leg, and by a radial mounting of the inner pipe being provided at a second point, which is located in the bend or in the second leg.

Contrary to the prior-art technology, a marked distance is thus provided between the sliding sit (first point) and the radial mounting (second point). Sliding fits offer a certain resistance to the relative movement of the two partners of the sliding fit; according to the present invention, the radial mounting of the inner pipe in the outer pipe is located at a point which prevents the inner pipe from yielding without a relative movement in the sliding fit, but it forces the sliding fit to "work." If the two legs of the exhaust pipe have different lengths, it is more favorable to provide the point containing the sliding fit in the longer of the two legs.

It is pointed out that the exhaust pipe according to the present invention is usually provided only as a partial section of the entire exhaust pipe train; thus, one also could speak of an exhaust pipe section. It is also pointed out that the inner pipe is rigidly connected to the outer pipe, although it is possible and sometimes even favorable to provide a sliding fit of the inner pipe relative to the outer pipe at least at one end of the exhaust pipe. It is also pointed out that the present invention can also be embodied in an exhaust manifold or the like, which may possibly have a shell design.

The radial mounting point is preferably located in the half of the bend adjacent to the second leg, or in the second leg in the vicinity of the bend. This arrangement ensures that the inner pipe is prevented most effectively from expanding as a unit without "working" of the sliding fit, and the difference in length in relation to the outer pipe is prevented most effectively from leading to an unsuitable reduction of the gap between the inner pipe and the outer pipe on the outside of the inner pipe bend.

The exhaust pipe according to the present invention is not limited to having only one bend as described. At least one additional bend may be present in the course of the first leg and/or of the second leg. If this is so, the above explanations preferably pertain to the bend of the exhaust pipe that has the greatest change in direction.

A first preferred possibility of designing the radial mounting as a variant of the present invention is by means of wire knit fabric. Wire knit fabric offers the advantage of applying a sufficiently strong holding force, with a pre-tension, if desired, on the inner pipe and of elastically compensating differences in radial thermal expansion between the inner pipe and the outer pipe. The simplest possibility is a circular ring of wire knit fabric between the inner pipe and the outer pipe.

However, as a variant of the present invention, a plurality of circumferentially spaced wire knit fabric elements are preferably provided instead of one circular wire knit fabric ring. Depending on the geometry of the course of the exhaust pipe and depending on the position of the second point, this makes possible a simpler manufacture of the exhaust pipe, as will be explained below.

The wire knit fabric, be it, e.g., a wire knit fabric ring or circumferentially spaced wire knit fabric elements, may be fastened to the outer pipe and/or to the inner pipe, especially by welding. The fastening of the wire knit fabric to the inner pipe or to the outer pipe may be performed during manufacture, prior to the fitting together and bending of the pipes, but it may also be performed after the fitting together and bending, especially in the case of a wire knit fabric pushed in subsequently as a radial mounting. As an alternative or in addition to this, it is possible to fix the wire knit fabric in the outer pipe in the axial direction, again before or after fitting together and bending, preferably between two beads of the outer pipe, which are located at axially spaced locations from one another.

A second preferred possibility of designing the radial mounting as a variant of the present invention is to provide it by means of a plurality of inwardly extending impressions of the outer pipe, which are located at circumferentially spaced locations from one another. These impressions can be prepared particularly efficiently and after fitting together and bending. The impressions should best extend inwardly to the extent that the inner pipe will be in contact with the impressions from the inside already in the cold state, so that no noise will be generated there even in the cold state.

In a preferred embodiment of the present invention, the impressions are spaced circumferentially so far from one another that circumference sections of sufficient length are free for elastic bulging during an increase in temperature at the second point on the inner pipe. The material of the inner pipe has a markedly lower strength at the operating temperature than in the cold state. It is therefore preferable for the impressions not to have only point contact with the inner pipe, but over a circumferential length corresponding to at least 30 degrees. In the circumference sections described between the contact(s) with the impressions, the inner pipe is able to elastically bulge out during an increase in temperature, without plastic deformation with the risk of a subsequently looser seating in the outer pipe taking place.

In a variant of the present invention, it is possible to manufacture the two inner pipe sections from different materials and/or with different wall thicknesses. Since the stresses on the inner pipe may be different over the length of the exhaust pipe, depending on the geometry of the pipe, it may be advantageous to provide an especially high-value material and/or a great wall thickness only where this is really necessary.

On the whole, austenitic, highly heat-resistant steels are usually used for the inner pipe, and less expensive, ferritic steels are used for the outer pipe.

Another object of the present invention is a process for manufacturing the exhaust pipe according to the present invention with bend and legs, characterized in that (a) the inner pipe, which has the two inner pipe sections connected via the sliding fit at the first point, is inserted into the outer pipe, while the radial mounting is prepared at the same time at the second point, (b) the space between the outer pipe and the inner pipe is filled with an essentially incompressible medium, (c) the bend is prepared by bending the double pipe arrangement, and (d) the medium is removed from the space between the outer pipe and the inner pipe.

As an alternative, the present invention also pertains to a process for manufacturing the exhaust pipe, characterized in that (a) the inner pipe, which has the two inner pipe sections connected via the sliding fit at the first point, is inserted into the outer pipe, (b) the space between the outer pipe and the inner pipe is filled with an essentially incompressible medium, (c) the bend is prepared by bending the double pipe arrangement,'

(d) the medium is removed from the space between the outer pipe and the inner pipe, and (e) the radial mounting is prepared at the second point.

Steel shot is preferably used as the incompressible medium.

As was described, the radial mounting is prepared in the aforementioned two processes by wire knit fabric, be it a wire knit fabric ring or circumferentially spaced elements of wire knit fabric, or by means of inwardly extending impressions of the outer pipe. Depending on the position of the second point in the exhaust pipe, there are, however, pipe sections in which wire knit fabric can subsequently be pushed in with difficulty at best after the bending of the double pipe arrangement. In the case of a radial mounting formed by impressions, it is often more efficient to prepare the radial mounting after the bending of the double pipe arrangement.

A radial mounting formed by impressions also offers the advantage that any eccentricity between the inner pipe and the outer pipe, which may be due to manufacturing tolerances of the inner pipe and the outer pipe as well as to the bending process, can be corrected by the impressions. However, it is also possible to intentionally provide impressions of different depth over the circumference and thus to bring about an intended eccentricity, especially in order to create more space between the inner pipe and the outer pipe in a defined radial direction of the radial mounting. As a result, more free space is created in a defined direction for temperature-dependent displacements of the inner pipe next to the radial mounting point.

It is emphasized that in addition to the radial mounting described, the exhaust pipe according to the present invention may also have another radial mounting or even a plurality of radial mountings of the inner pipe in the outer pipe at the second point described.

Special variants of the present invention include especially two variants of a sliding fit, via which the two inner pipe sections of the inner pipe are displaceably connected to one another, which variants are independent per se. The exhaust pipe may be designed with or without bend, i.e., as a straight exhaust pipe. As is stated in the claims, both variants of the present invention pertain not only to air-insulated, double-walled exhaust pipes, but the special variants of sliding fits may also be used in manifolds with or without shell design, plug-type pipe connections or the like. However, the variants of the sliding fit will be discussed here in connection with an exhaust pipe.

The first variant of the sliding fit especially pertains to the use of a spacer sleeve for mounting the inner pipe or for fitting together the inner pipe sections, wherein the spacer sleeve is inserted especially into the calibrated end area of one of the inner pipe sections, which end area forms the joining gap, until it reaches a defined, first axial end stop, after which the other inner pipe section is in turn inserted into a second, defined axial end stop of the spacer sleeve. After mounting of the sliding fit, the entire inner pipe is arranged in the outer pipe (or in a one-part or multipart shell), and the spacer sleeve may have radially outwardly projecting centering cams, which center the spacer sleeve, including the inner pipe area of the spacer sleeve, in the outer pipe, in order to provide an accurate, simple seating for the inner pipe before the latter is finally installed at another axial point in the outer pipe.

The spacer sleeve is made of a combustible material, such as polyethylene or polystyrene, which has a combustion temperature that is lower than the exhaust gas temperature of an internal combustion engine or the like. Thus, when the finally installed exhaust pipe is put into operation for the first time, the spacer sleeve will burn without residue, thereby releasing the exact sliding fit set before by the spacer sleeve. Thus, if sand (or another filling medium) is used for bending a bent exhaust pipe, this sand cannot enter the joining gap of the inner pipe sections, because this gap is occupied by the spacer sleeve until the sand is also removed. Contamination of the area of the sliding fit by filling medium is consequently not possible in any way.

The spacer sleeve provides for a forced positioning of the inner pipe sections in the outer pipe in the installed state. By using a spacer sleeve, both inner pipe sections are calibrated together in the plug-in area.

By using the aforementioned spacer sleeve, not only are the depth of insertion and the path of sliding defined and a forced position provided, but it is also possible, in particular, to reduce the tolerance of the gap dimension by at least 50% compared with individual processing of the two parts. In particular, it is possible to reduce the gap dimension between the pipe and the sleeve and between the inner pipe sections in the insertion area concerning diameter and layout tolerance by joint calibration. The concentricity of the gas-carrying inner pipe with the outer pipe during the phase of mounting is guaranteed by the centering cams of the spacer sleeve.

The second variant of the sliding fit pertains to a special calibration process for the circumference of the inner pipe sections in the end area of the plug-type and sliding connection. In particular, the two end areas are provided individually with a so-called polygon calibration, namely, by means of special calibrating mandrels or calibrating expanding segments, which create (in the front view of the inner pipe) a polygon by flattened areas of the previously round diameter, while round areas remain on the circumference between the flattened areas. The flattened areas, preferably three per inner pipe section, are especially distributed at equal distance on the circumference.

The inner pipe sections, individually calibrated polygonally, are now rotated circumferentially in relation to one another after they have been fitted together, until axial line contact is achieved between the parts. The circumferential rotation preferably corresponds to half a polygon pitch.

Thus, a defined shaping of the inner pipe sections is achieved according to the present invention, which prevents a relative movement of the two pipe ends of the plug-type connection in the radial direction by at least three axial line contacts between the parts, but it continues to permit a displacement of the parts in the axial direction, so that no rattling noises can develop during operation, not even on cold start of a vehicle. The positions of the two pipes in relation to one another are fixed despite the necessary gap. The outlays of the two pipe ends are dimensioned such that even different radial thermal expansions, which may occur, e.g., when different materials are used, can be compensated, without leading to blockage of the sliding fit. Thus, quasi a "special out-of-roundness" is created by the present invention in order to prevent rattling noises in a simple manner, even though it is not necessary to impose excessive requirements on the manufacturing tolerances of the individual parts.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a partially cut-away view of a double-walled exhaust pipe;

FIG. 2 is a cross section of the exhaust pipe according to FIG. 1 along line II—II;

FIG. 5 is a section similar to FIG. 1 in the area of a sliding fit of a special design;

FIG. 6 is a front view of FIG. 5, with the outer pipe omitted;

FIG. 7 is a cross section of FIG. 6 along line I—I;

DETAILED DESCRIPTION OF THE PREFERRED EMBODIMENTS

Figure 3:
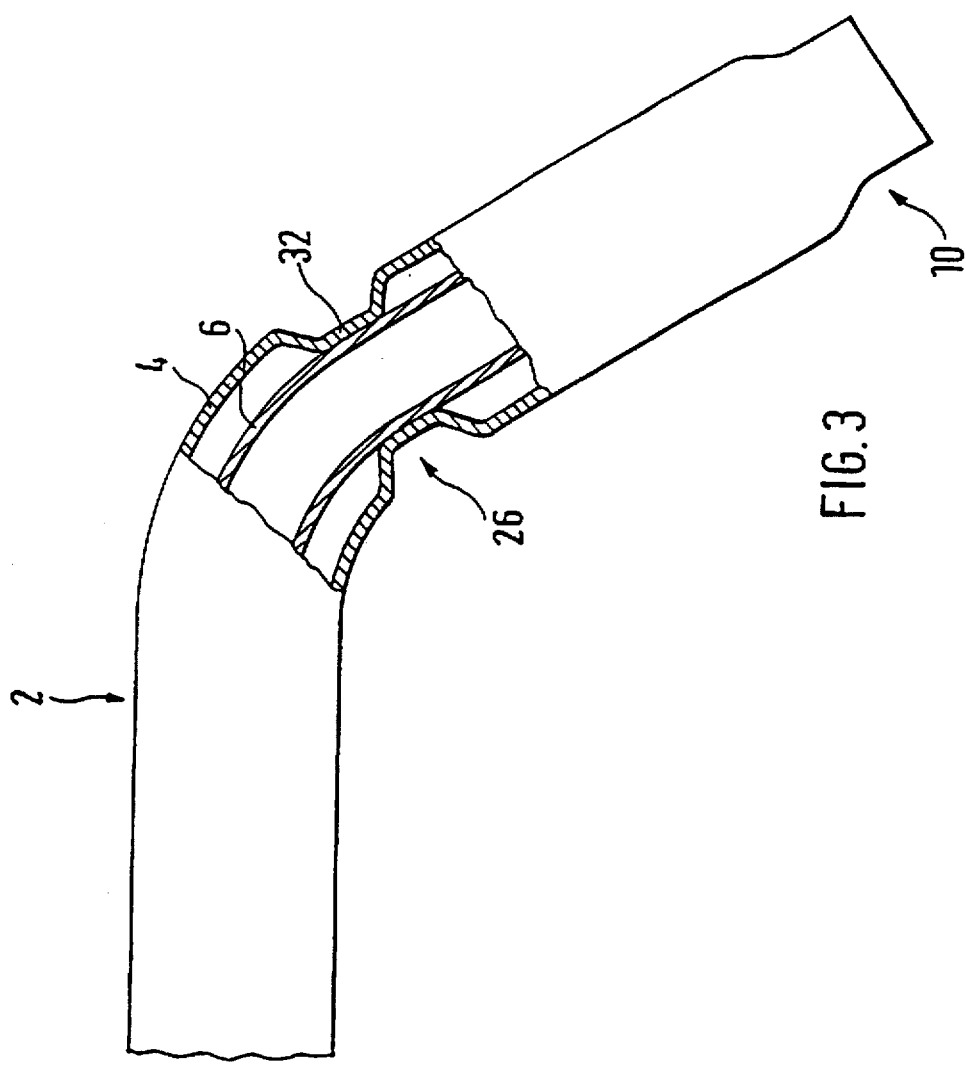
FIG. 3 is a partially cut-way partial view of a modified embodiment of the exhaust pipe according to FIG. 1.

The exhaust pipe 2 shown in FIG. 1 has an outer pipe 4 and an inner pipe 6, which is essentially concentric to the outer pipe, as its principal components. The diameter of the outer pipe 4 is reduced at both ends 8, 10 of the exhaust pipe 2 to the extent that it is in contact with the inner pipe 6, as can be recognized in the lower right part of FIG. 1. The outer pipe 4 and the inner pipe 6 are rigidly connected to one another, e.g., by welding, at the two ends 8, 10.

The inner pipe consists of a first inner pipe section 12 and a second inner pipe section 14, which are connected to one another via a sliding fit 16 at a first point, which will be described more specifically below. To form the sliding fit 16, the diameter of one of the two inner pipe sections 12, 14 is expanded in its end area there to the extent that the end area of the other inner pipe section at that location fits in with a relatively narrow, rattle-free seating, which does, however, permit a relative axial displacement of the two inner pipe sections in the sliding fit 16. Other details of design variants of the sliding fit will be described below.

Concerning the geometric shape, the exhaust pipe 2 is comprised of a first leg 18, a bend 20 joining the first leg 18, and a second leg 22 joining the bend 20. The first leg 18 has a considerably greater length than the second leg 22. Due to the bend 20, the exhaust pipe 2 has a relatively great change in direction there, which equals ca. 70° (angle W1) in the exemplary embodiment shown. The drawing plane of FIG. 1 is placed such that the longitudinal central axis of the second leg 22, the bent longitudinal central axis of the bend 20, and the longitudinal central axis of a partial area of the first leg 18 joining the bend 20 are located in the plane of the drawing.

The first leg 18 is not continuously straight, but it has another bend 24, which defines a much smaller change in direction than the above-described bend 20. The bent longitudinal central axis of the other bend 24 may, but does not have to, be located in the drawing plane of FIG. 1, so that the partial area of the first leg 18 located between the other bend 24 and the exhaust pipe end 8 may be located in the drawing plane or it may be led out of the drawing plane to the rear or to the front.

At a second point, which is located rather close to the end of the bend facing the second leg 22, a radial mounting 26 of the inner pipe 6 in the outer pipe 4 is provided. In the exemplary embodiment shown in FIGS. 1 and 2, the radial mounting 26 consists of three circumferentially distributed wire knit fabric elements 28, which are spaced from one another. In the exemplary embodiment shown, the wire knit fabric elements 28 have a circumferential length of 30° each. It would also be possible to provide a different number of wire knit fabric elements or a circular wire knit fabric ring.

The position of the sliding fit 16 in the first leg 18 is not critical. The sliding fit is usually provided approximately in the middle area of the length of the first leg 18.

When hot exhaust gas flows through the air gap-insulated, double-walled exhaust pipe 2, the inner pipe 6 undergoes a greater longitudinal expansion than the outer pipe 4, and a considerably larger portion of the differences in longitudinal expansion affects the first leg 18. The difference in longitudinal expansion is absorbed by the sliding fit 16 there, i.e., the two inner pipe sections 12, 14 are pushed together more by a certain amount there. The sliding fit 16 cannot be pushed together further without resistance. However, the radial mounting 26 at the second point described ensures that the sliding fit 16 does indeed "work" by exerting a pushing-together action during an increase in the temperature of the inner pipe 6, and the inner pipe 6 does not simply yield more to the outside of the bend 20 due to a local displacement, because the radial mounting 26 intentionally prevents precisely this yielding movement of the change in length originating from the first leg 18. A difference in longitudinal expansion between the outer pipe 4 and the inner pipe 6 is, of course, also generated in the second leg 22, but this difference is smaller because of the shorter length of the second leg 22 compared with that of the first leg 18. This difference in longitudinal expansion is absorbed by the inner pipe 6 coming somewhat closer to the outer pipe 4 approximately in the area 29 of the outside of the bend 20. The annular gap between the outer pipe 4 and the inner pipe 6 is large enough to absorb the displacement taking place there. Something similar takes place approximately in the area 30 of the outside of the other bend 24 as the effect of the difference in the longitudinal expansion between the inner pipe 6 and the outer pipe 4 in the partial area of the first leg 18 adjacent to the exhaust pipe end 8. Even if this partial area has a considerable length, the effects are less marked here, because the other bend 24 defines a smaller change in direction than the bend 20.

The radial mounting 26 may also be displaced farther to the left into the bend 20, and even beyond its apex, or it also could be positioned in the second leg 22, but preferably not far from the bend 20.

Figure 4:
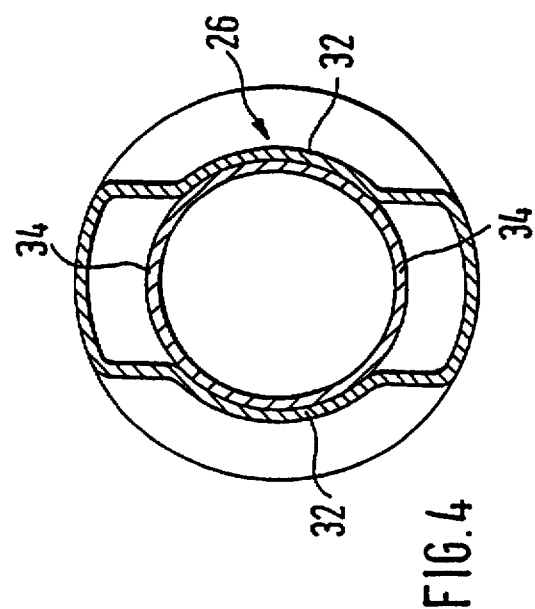
FIG. 4 is a cross section of the exhaust pipe according to FIG. 3 along line IV—IV.

FIGS. 3 and 4 show modified embodiments of the radial mounting 26, in which only the differences from the first embodiment described are described. Instead of the wire knit fabric elements 28, a plurality of impressions 32, which are spaced from one another and distributed over the circumference of the exhaust pipe 2, are prepared on the outer pipe 4. The impressions 32 extend inwardly to the extent that there is a rattle-free mounting contact between the inner pipe 6 and the outer pipe 4 in the cold state of the exhaust pipe. In the exemplary embodiment shown, the circumferential length of the impressions, which is in contact with the inner pipe 6, is ca. 90°; two diametrically opposed impressions 32 are provided. It would also be possible to provide a greater number of impressions 32 distributed over the circumference and located at spaced locations from one another in the circumferential direction. However, free circumferential sections 34 of the inner pipe 6, which are long enough in the circumferential direction to permit the inner pipe 6 to bulge out elastically during an increase in temperature, are preferably left between the impressions 32, which are in contact with the inner pipe 6. This prevents the inner pipe 6 from undergoing plastic deformation during an increase in temperature in the radial mounting 26. The consequence of a plastic deformation taking place there would be that the inner pipe 6 would no longer be seated tightly in the radial mounting 26 during the subsequent cooling.

It is pointed out that the exhaust pipe described may also have additional bends, e.g., another bend even with a relatively great change in direction in the first leg 18 rather close to the end 8. If the pipe length between this additional bend and the end 8 is not too great, the fastening of the inner pipe 6 and of the outer pipe 4 to one another in the area of the end 8 brings about a fixation which prevents the described undesired yielding movements of the inner pipe 6. Especially if the additional bend defines a great change in direction, and the pipe length between this additional bend and the end 8 is also considerable at the same time, an additional radial mounting 26 analogous to the radial mounting described may be provided in that area.

The exhaust pipes 2 described so far can be manufactured by inserting the inner pipe 6 already provided with the sliding fit 16 into the outer pipe 4 and establishing the firm connection between the inner pipe 6 and the outer pipe 4 at one of the two ends 8, 10. Then, e.g., sand is introduced into the annular gap space between the inner pipe 6 and the outer pipe 4 over the entire length. This double pipe arrangement can then be bent according to a common, simple technology to prepare any desired bend 20, 24, etc. The sand is then released from the annular gap space via the yet unconnected end 10. The firm connection between the inner pipe 6 and the outer pipe 4 is finally prepared at the end 10.

The radial mounting 26 may optionally be prepared before or after the bending process. For the first possibility, the three wire knit fabric elements 28 are fastened, e.g., to the inner pipe 6 by resistance welding before this inner pipe 6 is inserted into the outer pipe 4. The sand to be filled in can pass through the radial mounting point through the free circumferential areas between the wire knit fabric elements 28. The situation is similar in the case of the alternative radial mounting 26 by means of impressions 32 if these are prepared prior to the bending of the double pipe arrangement. However, the preparation of the radial mounting 26 with the impressions 32 is especially suitable for the second possibility, i.e., preparation after bending. However, the second possibility can also be carried out with a wire knit fabric ring or with wire knit fabric elements 28, e.g., by pushing axially into the annular space after bending and removal of the sand. Axial fixation of the wire knit fabric may be performed, e.g., by circular impressions on both sides next to the wire knit fabric, by resistance welding to the outer pipe 4 or the like.

The radial mounting 26 is usually prepared with such a strong pressing force on the inner pipe 6 that the inner pipe 6 can still be displaced in the axial direction there in relation to the outer pipe 4. Excessively strong pressing force is disadvantageous, because the inner pipe 6 would thus reach the range of plastic deformation in the area of the radial mounting 26 too easily during an increase in temperature.

FIGS. 5 through 7 show a special embodiment of a sliding fit 16 between the inner pipe sections 12, 14, which are concentrically embedded in the outer pipe 4 of the exhaust pipe 2 and are also centered.

In particular, a spacer sleeve 40 is used during the assembly of the jointly calibrated inner pipe sections 12, 14 by fitting together; this spacer sleeve has a circular design, comprised of a combustible material, preferably a plastic, and it is burned by the heat of the exhaust gas at the time the exhaust pipe is put into operation for the first time after complete installation, so that it releases a functionally and dimensionally optimized sliding fit 16. The spacer sleeve 40 is consequently needed only during the phase of manufacture.

The spacer sleeve has circumferential shoulders at its axial ends. One of the circumferential shoulders of the spacer sleeve, the right-hand one according to the drawing, is a radially inwardly pointing circumferential projection, and it forms a first axial end stop 41 for the pipe end of the second inner pipe section 14. The other circumferential shoulder of the spacer sleeve 40, the left-hand one according to the drawing, is a radially outwardly pointing circumferential projection, and it forms a second axial end stop 42 for the pipe end of the first inner pipe section 12. The axial distance between the two axial end stops 41, 42 determines the depth of insertion t of the second inner pipe section 14 in the first inner pipe section 12, and consequently also the path of sliding s at a predetermined axial length of a calibration of the inner pipe section 12, as can be determined especially from FIG. 5.

The spacer sleeve 40 also has, radially on the outside to the second axial end stop 42, four centering cams 43, which are uniformly distributed over the circumference, and the spacer sleeve as a whole is designed as a one-piece spacer sleeve, i.e., the centering cams 43 and the axial end stops 41, 42 are integrated components of the sleeve. In particular, three centering cams 43 (contrary to the exemplary embodiment shown) are used, which, statically determined, make possible an accurate contact with the inner circumference of the outer pipe 4.

A defined shaping as well as the use of a spacer sleeve 40 thus guarantee that rattling noises and function-impairing disturbances cannot occur in the pulsating gas flow and during operation, because the joining gap can be adjusted depending on the temperature and expansion.

FIGS. 8 through 11 show another variant of the sliding fit, which also prevents rattling noises or blockage, as described above, from occurring by simple means.

In particular, a defined shaping is used, which is formed by polygon calibration on the circumference of the end areas of the two inner pipe sections 12, 14.

During the calibration of the inner pipe sections 12, 14 in the exemplary embodiment shown in FIGS. 8 through 11 by means of six expanding segments, a surface of at least 0.3 mm is ground on every other segment in the outer radius. A circular shape with three flattened areas 44 offset by 120° each is formed at the pipe ends.

Figure 9:
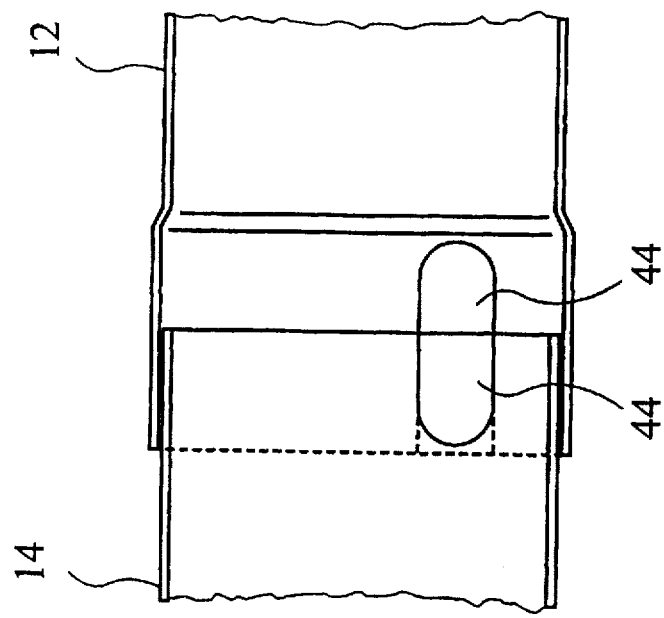
FIG. 9 is a cross section of FIG. 8 along line III—III.
Figure 8:
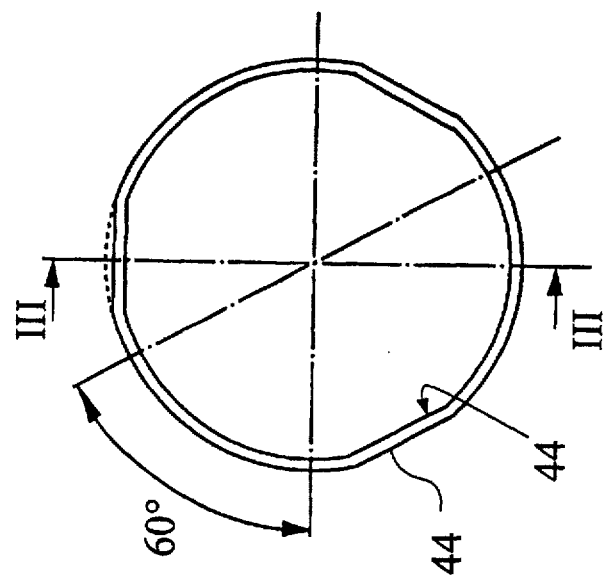
FIG. 8 is a front view in the joined state of another sliding fit similar to that shown in FIG. 6.

In the joined state according to FIGS. 8 and 9, the flattened areas 44 of the two pipe ends are located congruently one above another and release the joining gap.

Figure 11:
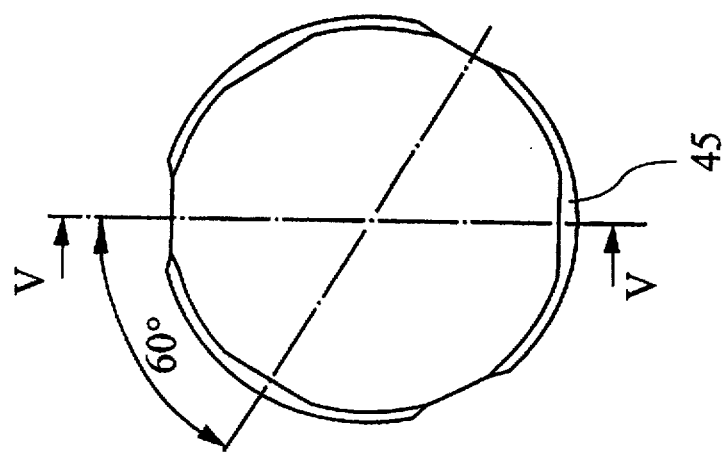
FIG. 11 is a cross section of FIG. 10 along line V—V, similar to FIG. 9.
Figure 10:
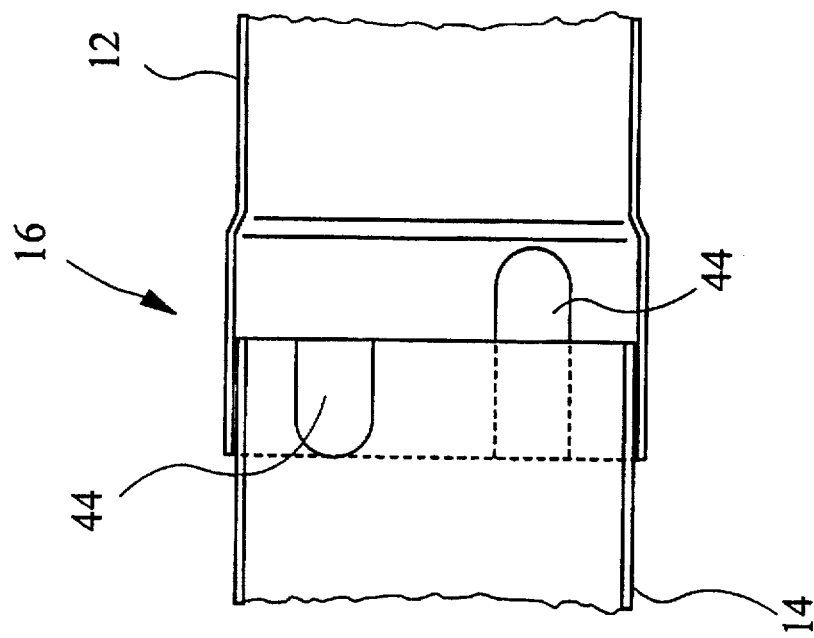
FIG. 10 is a front view of the sliding fit according to FIG. 8 after rotation or in the mounted state.

The inner pipe sections 12, 14 are then rotated to the installed state according to FIGS. 10 and 11 by half the pitch angle of the polygon, here 60°, in relation to one another, and three line contacts, which reliably prevent rattling and equally guarantee the axial displaceability of the individual parts, are formed. The inner pipe section 14, which is heated during operation, is able to radially expand into the free circumferential spaces 45, without causing blockage of the sliding fit.

While specific embodiments of the invention have been shown and described in detail to illustrate the application of the principles of the invention, it will be understood that the invention may be embodied otherwise without departing from such principles.

What is claimed is:

1. A process for manufacturing an air gap-insulated, double-walled exhaust pipe, as part of an air gap-insulated exhaust pipe assembly, the process comprising the steps of:

providing an outer pipe;

providing a gas-carrying inner pipe, which has a first inner pipe section and a second inner pipe section;

connecting said first inner pipe section and said second inner pipe section to one another via a sliding fit; and maintaining a space between said two inner pipe sections to preserve said sliding fit during subsequent formation of said air gap-insulated exhaust pipe assembly.

2. The process according to claim 1, wherein:

said outer pipe and said two inner pipe sections connected via said sliding fit define said air gap-insulated exhaust pipe assembly, said assembly having a first leg, a second leg, and a bend connecting the two legs, a radial mounting for mounting said two inner pipe sections connected via said sliding fit in said outer pipe at least at one point between ends of said exhaust pipe assembly, said sliding fit connection being provided at a first point, which is located in said first leg, and said radial mounting being provided at a second point, the process further comprising the steps of:

(a) inserting said two inner pipe sections connected via said sliding fit into said outer pipe at a location adjacent to said the first point;

(b) filling the space between said outer pipe and said inner pipe with an essentially incompressible medium;

(c) preparing said bend by bending said double pipe arrangement;

(d) removing the medium from the space between said outer pipe and said inner pipe; and (e) preparing said radial mounting at said second point.

3. The process for manufacturing a double-walled exhaust pipe according to claim 2, wherein said radial mounting is prepared at substantially the same time as said step of inserting said inner pipe.

4. The process for manufacturing a double-walled exhaust pipe according to claim 2, wherein said radial mounting is prepared subsequently to said step of removing the medium.

5. The process according to claim 1, further comprising the steps of using a spacer sleeve arranged between said first inner pipe section and said second inner pipe section for maintaining said space during mounting of said inner pipe sections, said inner pipe sections being aligned axially to one another and have a joining gap defining said sliding fit, said spacer being disposed in said joining gap; and subsequently burning said spacer by heat of the exhaust gas when the said exhaust pipe is put into operation for the first time, thus releasing said sliding fit.

6. The process in accordance with claim 5, wherein a depth of insertion (t) and/or the path of sliding (s) of said second inner pipe section in said first inner pipe section is determined by said spacer sleeve.

7. The process in accordance with claim 5, wherein a gap dimension of a joining gap in terms of a diameter and layout tolerance of said inner pipe sections is determined by said spacer sleeve by joint calibration.

8. The process in accordance with claim 5, wherein said inner pipe is centered with said outer pipe by said spacer sleeve.

9. The process in accordance with claim 7, wherein said spacer sleeve is inserted into a calibrated end area of said first inner pipe section forming the joining gap to a defined first axial end stop, and an end area of said second inner pipe section is subsequently inserted up to a defined second axial end stop.

10. The process in accordance with claim 9, wherein said inner pipe sections, fitted together, including the said spacer sleeve, are inserted into said outer pipe, and said inner pipe is centered in the said outer pipe by radially outer centering cams of the said spacer sleeve, which are distributed on the circumference.

11. The process according to claim 1, further comprising the steps of:

preparing said sliding fit by polygon calibration on a circumference of said inner pipe sections in an end area of a plug-type sliding connection; and maintaining said space with individually polygonally calibrated inner pipe sections and rotating said sections in relation to one another after having been fitted together, until an axial line contact is formed between the end areas of said inner pipe sections.

12. The process in accordance with claim 11, wherein said individually polygonally calibrated inner pipe sections are rotated in relation to one another by half of a pitch angle of the polygon calibration after fitting together.

13. The process in accordance with claim 11, wherein the polygon calibration is prepared by uniformly distributed flattened areas, especially three said flattened areas per said pipe section, on the circumference of the pipe.

14. The process in accordance with claim 11, wherein the polygon calibration is performed by means of fixed or adjustable calibrating mandrels.

15. The process in accordance with claim 11, wherein the polygon calibration is performed by means of expanding segments.

16. The process in accordance with claim 15, wherein the polygon calibration is performed by means of six expanding segments, with a surface of at least 0.3 mm ground on every other expanding segment in an outer radius thereof.

17. A process for manufacturing an air gap-insulated, double-walled exhaust pipe, as part of an air gap-insulated exhaust pipe assembly, the process comprising the steps of:

providing an outer pipe;

providing a gas-carrying inner pipe, which has a first inner pipe section and a second inner pipe section;

connecting said first inner pipe section and said second inner pipe section to one another via a sliding fit; and maintaining a space between said two inner pipe sections and said outer pipe during subsequent formation of said air gap-insulated exhaust pipe assembly.

18. The process according to claim 17, wherein:

wherein a radial mounting is used for mounting said two inner pipe sections connected via said sliding fit in said outer pipe at least at one point between ends of said exhaust pipe assembly, the process further comprising the steps of:

(a) inserting said two inner pipe sections connected via said sliding fit into said outer pipe at a location adjacent to said the first point;

(b) filling the space between said outer pipe and said inner pipe with an essentially incompressible medium;

(c) preparing said bend by bending said double pipe arrangement;

(d) removing the medium from the space between said outer pipe and said inner pipe; and (e) preparing said radial mounting at said second point.

19. The process according to claim 17, further comprising the steps of:

using a spacer sleeve arranged between said first inner pipe section and said second inner pipe section for maintaining a space during mounting for preserving said sliding fit of said inner pipe sections, said inner pipe sections being aligned axially to one another and have a joining gap defining said sliding fit, said spacer being disposed in said joining gap; and subsequently burning said spacer by heat of the exhaust gas when the said exhaust pipe is put into operation for the first time, thus releasing said sliding fit.

20. The process according to claim 17, further comprising the steps of:

preparing said sliding fit by polygon calibration on a circumference of said inner pipe sections in an end area of a plug-type sliding connection; and maintaining a space during mounting for preserving said sliding fit of said inner pipe sections with individually polygonally calibrated inner pipe sections and rotating said sections in relation to one another after having been fitted together, until an axial line contact is formed between the end areas of said inner pipe sections.

* * * * *